(12) United States Patent
Chou et al.

(10) Patent No.: US 11,953,968 B1
(45) Date of Patent: Apr. 9, 2024

(54) ERGONOMIC AND HIGH-PERFORMANCE POWER SUPPLIES FOR COMPUTERS

(71) Applicant: Corsair Memory, Inc., Milpitas, CA (US)

(72) Inventors: Leon Chou, Shenzhen (CN); Raymond Wong, Milpitas, CA (US); Jon Gerow, Milpitas, CA (US)

(73) Assignee: Corsair Memory, Inc., Milpitas, CA (US)

(*) Notice: Subject to any disclaimer, the term of this patent is extended or adjusted under 35 U.S.C. 154(b) by 0 days.

(21) Appl. No.: 18/447,263

(22) Filed: Aug. 9, 2023

(51) Int. Cl.
*G06F 1/3234* (2019.01)
*G06F 1/16* (2006.01)

(52) U.S. Cl.
CPC .......... *G06F 1/3253* (2013.01); *G06F 1/1658* (2013.01)

(58) Field of Classification Search
CPC ......... G06F 1/26; G06F 1/1658; G06F 1/3253
USPC ........................................................ 713/300
See application file for complete search history.

(56) References Cited

U.S. PATENT DOCUMENTS

| | | | |
|---|---|---|---|
| 9,756,756 B2* | 9/2017 | Martin-Otto | H05K 7/1491 |
| 10,381,758 B1* | 8/2019 | Scanlon | H01R 12/716 |
| 10,481,661 B2* | 11/2019 | Cooper | G06F 1/263 |
| 11,269,387 B2* | 3/2022 | Chang | G06F 1/189 |
| 2010/0151749 A1* | 6/2010 | Po | H01R 25/16 |
| | | | 439/884 |
| 2021/0103321 A1* | 4/2021 | Huang | H02M 7/02 |

OTHER PUBLICATIONS

"Corsair Launches Shift PSUs with Side-Mounted connectors"—URL: https://www.extremetech.com/computing/342767-corsair-launches-shift-psus-with-side-mounted-connectors; Dated Feb. 1, 2023; 3 pages (Year: 2023).*
"Corsair's funky new power supply moves the connectors to the side"—URL: https://www.pcworld.com/article/1499073/corsairs-funky-new-power-supply-shorts-diy-pc-build-problems.html; Dated Jan. 31, 2023; 3 pages (Year: 2023).*

* cited by examiner

*Primary Examiner* — Brian T Misiura
(74) *Attorney, Agent, or Firm* — Carina M. Tan; Corsair Memory, Inc.

(57) ABSTRACT

An ergonomic power supply for a computer system includes a printed circuit board assembly configured to convert a mains electricity input to voltage-regulated, direct-current (DC) outputs. The printed circuit board assembly defines a mains input and has one or more DC output connectors. An enclosure houses a fan and the printed circuit board assembly. The enclosure has a rear panel, a front panel positioned opposite the rear panel relative to the printed circuit board assembly. A side panel is positioned between the front and rear panel. The mains connector extends through an aperture defined by the rear panel of the enclosure. The one or more DC output connectors extend through the side panel. Such an arrangement provides significantly easier access to the power supply outputs compared to conventional power supplies. Associated computer systems also are described.

18 Claims, 4 Drawing Sheets

ERGONOMIC AND HIGH-PERFORMANCE POWER SUPPLIES FOR COMPUTERS

FIELD

This application and the subject matter disclosed herein (collectively referred to as the "disclosure"), generally concern power supplies for desktop computers, as well as related systems and methods. More particularly, but not exclusively, this disclosure pertains to power supplies that are compatible with the ATX (Advanced Technology Extended) specification.

BACKGROUND INFORMATION

Conventional desktop computer systems have, in their most basic configuration, a processing unit and a memory. Most desktop computer systems, however, include several additional functional sub-systems. Power supplies are fundamental components used in desktop computers to convert alternating current (AC) from the mains power source into direct current (DC) at various voltage levels required by the computer's internal components. The ATX standard, developed and promulgated by Intel Corporation in the 1990s, has become the de facto standard for computer chassis (e.g., housing and enclosure) and power supplies in modern desktop computers due to its industry-wide adoption and compatibility with a diverse range of computer hardware and form factors. The ATX standard, whether considered in context of chassis or power supplies, provides an organized framework for integrating and assembling various components and sub-systems into a functional desktop computer system.

For example, the ATX chassis specification and design guidelines define dimensions and positions for components and interfaces. More particularly, the ATX chassis standard defines locations and sizes of holes and stand-off heights for mounting motherboards and related components within the chassis, as well as locations and sizes of other features for mounting drive bays, expansion cards, cooling systems, and power supplies.

ATX-compatible power supplies deliver power to the motherboard, central processing unit (CPU), graphics card, storage devices, and other peripherals. It plays a crucial role in ensuring the stable and reliable operation of the computer system. The ATX power supply standard further specifies a layout for power-supply components that adheres to the ATX specification while also specifying requirements for delivering regulated and efficient electrical power to the various sub-systems of the computer. For example, the ATX power supply specification sets forth dimensions and feature positions for the power-supply housing, ensuring that an ATX-compatible power supply can be assembled with other ATX-compatible components. The ATX specification also sets forth other functional requirements relating to, for example, electrical mains input, main transformer and filtering, DC-DC conversion, output rectification, cooling, protection circuitry, and externally accessible DC connectors.

A computer's power supply typically includes an input stage, a main transformer and filtering, as well as cooling components and selected protective circuitry. The input stage can include an input connector for connecting to a mains power source, e.g., an IEC C14 connector. The input stage can also include other components, such as, for example, as EMC/EMI (electromagnetic compatibility/electromagnetic interference) filters, bridge rectifiers, and bulk capacitors, responsible for converting the incoming mains power to an unregulated DC voltage.

The main transformer transforms the unregulated DC voltage into different voltage levels suitable for the computer's internal components and the filtering stage includes capacitors and inductors to reduce ripple and ensure stable DC output voltages. The DC-DC converters regulate the transformed DC voltages to provide the various required output voltages, such as +12V, +5V, and +3.3V. The regulated DC voltages from the DC-DC converters are further rectified and smoothed to deliver clean and stable DC output voltages to the computer components.

In addition, a power supply can include one or more cooling components, e.g., fans and heat sinks Fans facilitate airflow through the power supply to dissipate heat generated by power supply components. Power transistors, diodes, and other components generate significant heat and are often equipped with heat sinks to enhance heat dissipation over that available from airflow alone.

A disclosed power supply can also include selected protection mechanisms, e.g., over-current protection, over- and under-voltage protection, short-circuit protection, and over temperature protection. Each of these forms of protection include a monitoring aspect and a control aspect. For example, when a monitored quantity (e.g., temperature) exceeds a selected threshold, protection circuitry of the control aspect can be activated to limit or shut-off output in an attempt to prevent damage to the power supply and/or components powered by the power supply.

ATX specifications, design guidelines and conventional implementations of those specifications and guidelines have ensured, for decades, that ATX-compliant chassis, motherboards, power supplies and peripherals can be assembled into a functional computer. As an example, the standardized locations of these sub-systems and practical considerations relating to component cooling (e.g., airflow) and interconnecting these sub-systems with cables, as well as aesthetic considerations, have driven conventional approaches for routing cables within ATX-compatible computer systems. Conventional ATX-compatible power supplies commonly position the DC output connectors (e.g., for powering the CPU, graphics card, storage devices and other peripherals) on a front panel of the power supply housing. In such conventional ATX-compatible power supplies, the DC output connectors face outward of the power supply housing toward the front panel of the computer chassis. Conventional, forward-facing DC connectors for ATX-compatible power supplies include the following: (1) Motherboard Power Connector: a 24-pin connector for supplying power to the motherboard and its associated components; (2) CPU Power Connector: a 4/8-pin CPU power connector for providing power to the central processing unit (CPU); (3) PCIe Connectors: PCIe connectors for powering graphics cards and expansion cards; (4) Serial ATA (SATA) Connectors: SATA connectors for providing power to storage devices, e.g., hard drives and solid-state drives; and (5) Molex Connectors: Molex connectors for providing power to legacy peripherals and cooling devices (e.g., fans).

Through such long-term and industry-wide adoption of the ATX standard and conventional implementations of the various ATX components, consumers can confidently purchase ATX-compatible components from a variety of suppliers knowing the various components can be assembled into a functional computer system.

SUMMARY

Despite the longstanding, industry-wide, conventional practice of positioning the DC connectors for ATX-compatible power supplies on a forward-facing panel of the power-supply housing, disclosed power supplies position the DC connectors along a side panel of the power-supply housing. By providing the DC connectors on the side panel, users can enjoy more convenient access to the connectors compared to conventional ATX-compatible power supplies. For example, with a disclosed power supply, a user does not need to reach so deeply into an interior of the chassis or into as small of an open space compared to conventional ATX-compatible power supplies that place the DC connectors on a forward-facing panel that is inherently close to the specified position for the drive bays. Further, ATX-compatible power supplies that position the DC connectors on a side panel of the power supply offer improved cable management through more straight-forward cable routing compared to conventional power supplies that position the DC connectors on the forward-facing panel. The straightforward cable routing provided by disclosed power supplies also promotes better system cooling compared to conventional cable routing driven by DC connectors being positioned on the forward-facing panel of the power supply housing. Despite relocating the DC connections from their conventional positions, disclosed power-supply layouts retain full compliance with current and legacy versions of the ATX standard, adhering to specified electrical parameters, safety features, and form factor dimensions.

In some respects, concepts disclosed herein generally concern ergonomic and high-performance power supplies for desktop computers. Concepts are described in relation to ATX-compatible embodiments for convenience and succinctness. Some disclosed concepts pertain to ATX-compatible components (e.g., power supplies, motherboards and chassis). Nevertheless, disclosed concepts, generally, are not so limited and may be adapted to embodiments that comply with some, all, or none of the ATX specifications. Further, disclosed concepts may be adapted to embodiments that do not comply with any other specifications.

According to a first aspect, a power supply for a computer system includes an enclosure housing a corresponding printed circuit board. The enclosure has a rear panel, a front panel positioned opposite the rear panel, and a pair of opposed side panels positioned between the front panel and the rear panel. The printed circuit board defines a rear edge, a front edge positioned opposite the rear edge, and a pair of opposed side edges, each side edge extending from the rear edge to the front edge. The printed circuit board is so oriented within the enclosure that the rear edge, the front edge and each side edge of the printed circuit board correspond, respectively, to the rear panel, the front panel, and one of the opposed side panels of the enclosure.

According to the first aspect, a mains electricity input to the printed circuit board is positioned adjacent the rear panel of the enclosure. A diode bridge configured to convert the mains electricity input to the printed circuit board from an alternating current (AC) to a direct current (DC) is coupled with the printed circuit board. More particularly the diode bridge is positioned adjacent one of the side edges of the printed circuit board's pair of side edges. An electrical connector is coupled with the printed circuit board at a position opposite the diode bridge, relative to the printed circuit board. For example, the electrical connector can be positioned adjacent the other one of the printed circuit board's pair of side edges. While the power supply operates, the electrical connector outputs a voltage-regulated form of the DC converted from the AC mains input.

A back plate can support the electrical connector. And, the electrical connector can extend through the side panel of the enclosure opposite the side edge of the printed circuit board that is adjacent the diode bridge.

Some power supply embodiments also include a power-factor correction coil coupled with the printed circuit board between the diode bridge and the back plate.

Some power supply embodiments also include a DC-to-DC daughter board configured to transform 12V DC to one or both of 3.3V DC and 5V DC. Such a daughter board can define an elongate longitudinal axis. Similarly, the back plate can define an elongate longitudinal axis. In some power supply embodiments, the elongate longitudinal axis of the DC-to-DC daughter board is oriented transverse relative to the elongate longitudinal axis of the back plate. In some embodiments, the daughter board's elongate longitudinal axis can be oriented substantially parallel with the front edge of the printed circuit board. In some embodiments, the DC-to-DC daughter board is positioned adjacent the front edge of the printed circuit board. Thus, with some power supply embodiments, the voltage-regulated form of the DC converted from the AC mains input can include one or more of a +3.3V DC output, a +5V DC output and a +12V DC output. For example, the voltage-regulated form of the DC converted from the AC mains input can include at least one +3.3V DC output, at least one +5V DC output and at least one +12V DC output.

Some power supply embodiments provide more than one DC electrical connector. For example, the electrical connector according to the first aspect can be a first DC electrical connector and the voltage-regulated form of the DC can be a first voltage-regulated form of the DC corresponding to the first DC electrical connector. Such a power supply can also include a second DC electrical connector coupled with the printed circuit board at a position opposite the diode bridge, relative to the printed circuit board. The second DC electrical connector can output a second voltage-regulated form of the DC converted from the AC mains input. Each of the first voltage-regulated form and the second voltage-regulated form of the DC converted from the AC mains input can include one or more of a +3.3V DC output, a +5V DC output and a +12V DC output.

Some power supply embodiments also include a plurality of bulk capacitors coupled with the printed circuit board adjacent each other and laterally inboard from the pair of opposed side edges. Such a power supply can also include a main transformer coupled with the printed circuit board laterally inboard from the pair of opposed side edges and adjacent the plurality of bulk capacitors. As noted, a back plate can support the electrical connector. The main transformer and the plurality of bulk capacitors can be positioned between the diode bridge and the back plate.

Some embodiments of power supplies also include an LLC-resonant circuit having an inductor and an array of half-bridge MOSFETs. The inductor and the array of half-bridge MOSFETs can be positioned adjacent to, but not between, the main transformer and the plurality of bulk capacitors. For example, the inductor and the array of half-bridge MOSFETs can be positioned between the rear panel of the enclosure and one or both of the main transformer and the plurality of bulk capacitors.

According to another aspect, computer systems incorporate embodiments derived from disclosed principles. For example, a computer system can include a motherboard having a power connector for receiving a direct current (DC) power input. The motherboard can also have circuitry to convey the DC power input to a processing unit and a memory, as well as a signal bus interconnecting the processing unit and the memory with each other. Such a computer system also includes an enclosure having a rear panel, a front panel positioned opposite the rear panel, and a pair of opposed side panels positioned between the front panel and the rear panel. A printed circuit board assembly is positioned in the enclosure and is configured to rectify an AC mains power input to one or more voltage-regulated DC outputs suitable for powering the processing unit and the memory. The printed circuit board assembly has a mains input positioned adjacent the rear panel of the enclosure and a DC output connector positioned adjacent a selected one of the side panels in the pair of side panels. The printed circuit board assembly further has a diode bridge configured to convert the mains power input from an alternating current to a direct current. The diode bridge is positioned adjacent the other one of the side panels in the pair of side panels. As well, an electrical cable electrically couples with the DC output connector and the motherboard circuitry to power the processing unit and the memory with the one or more voltage-regulated DC outputs.

According to some computer system embodiments, the printed circuit board assembly includes a power-factor correction coil and a back plate supporting the DC output connector. The power-factor correction coil can be coupled with the printed circuit board between the diode bridge and the back plate.

A computer system embodiment can also include a plurality of bulk capacitors and a main transformer. The plurality of bulk capacitors can be coupled with the printed circuit board assembly adjacent each other. The main transformer can be coupled with the printed circuit board assembly at a position adjacent the plurality of bulk capacitors. The main transformer and the plurality of bulk capacitors can be positioned laterally inward of the diode bridge and the back plate relative to the opposed side panels of the enclosure.

A computer system embodiment can include an LLC-resonant circuit having an inductor and an array of half-bridge MOSFETs. The inductor and the array of half-bridge MOSFETs can be positioned adjacent to, but not between, the main transformer and the plurality of bulk capacitors. In some embodiments, the inductor and the array of half-bridge MOSFETs are positioned between the rear panel of the enclosure and one or both of the main transformer and the plurality of bulk capacitors.

According to yet another aspect, a power supply for a computer system includes a printed circuit board assembly configured to convert a mains electricity input (e.g., 120 VAC or 240 VAC) to one or more voltage-regulated, direct-current (DC) outputs. The printed circuit board assembly defines a mains input and comprises one or more output connectors. Each of the one or more output connectors corresponds to a selection of the one or more voltage-regulated, DC outputs. The power supply also includes a mains connector for receiving the mains electricity input. A fan is arranged to urge a flow of air past the printed circuit board assembly. Further, the power supply has an enclosure housing the fan and the printed circuit board assembly. The enclosure has a rear panel, a front panel positioned opposite the rear panel, and a side panel positioned between the front panel and the rear panel. The rear panel of the enclosure defines an aperture, and the mains connector extends through the aperture defined by the rear panel of the enclosure. The side panel defines at least one aperture corresponding to at least one of the one or more output connectors.

In some embodiments, the mains input defined by the printed circuit board assembly can include the mains connector.

The one or more voltage-regulated, DC outputs can include one or more of a +3.3V DC output, a +5V DC output and a +12V DC output. In some embodiments, the DC outputs include at least one +3.3V DC output, at least one +5V DC output and at least one +12V DC output.

In some embodiments, at least one of the one or more output connectors comprises a plurality of electrical conductors. At least one of the plurality of electrical conductors can correspond to the +3.3V DC output, at least one of the plurality of electrical conductors can correspond to the +5V DC output and at least one of the plurality of electrical conductors can correspond to the +12V DC output.

The one or more output connectors can be configured to supply sufficient power across the +3.3V DC output, the +5V DC output and the +12V DC output to supply power to an ATX-compatible, 24-pin motherboard connector.

The printed circuit board assembly can define a pair of opposed sides positioned between the front panel of the enclosure and the rear panel of the enclosure. Further, the printed circuit board assembly can include a back plate supporting the one or more output connectors and a diode bridge for converting the mains electricity input from an alternating current (AC) to a direct current (DC). The back plate can be positioned adjacent one of the pair of opposed sides of the printed circuit board assembly and the side panel defining the aperture corresponding to at least one of the one or more output connectors. The diode bridge can be positioned adjacent the other of the pair of sides of the printed circuit board assembly, opposite the back plate.

In some embodiments, the printed circuit board assembly further comprises a power-factor correction coil positioned between the diode bridge and the back plate.

The printed circuit board assembly can define a pair of opposed sides positioned between the front panel of the enclosure and the rear panel of the enclosure. The printed circuit board assembly can also include a plurality of bulk capacitors and a main transformer positioned adjacent to each other. Each of the main transformer and the plurality of bulk capacitors can be positioned laterally inboard of the opposed sides of the printed circuit board assembly. The printed circuit board assembly can also include an LLC-resonant circuit having an inductor and an array of half-bridge MOSFETs. In some embodiments, neither the inductor nor the array of half-bridge MOSFETs is positioned between the main transformer and the plurality of bulk capacitors.

According to still another aspect, a computer system includes a motherboard having a power connector for receiving a direct current (DC) power input. The motherboard also has a signal bus interconnecting the processing unit and the memory, as well as circuitry to convey the DC power input to a processing unit and a memory.

The computer system also has an enclosure comprising a chassis. The motherboard and the chassis have complementary mounting features suitable to mount the motherboard within the enclosure.

The computer system also includes a power supply. The power supply and the chassis have complementary mounting features suitable to mount the power supply within the enclosure. The chassis has a rear panel, and the power supply has a rear panel corresponding to the rear panel of the chassis. The power supply includes a printed circuit board assembly configured to convert a mains electricity input to one or more voltage-regulated, direct-current (DC) outputs. The power supply has a front panel positioned opposite the rear panel of the power supply relative to the printed circuit board assembly. Further, the power supply defines a side panel positioned between the front panel of the power supply and the rear panel of the power supply. The power supply also includes a mains-input connector extending through the rear panel of the power supply and a plurality of DC output connectors extending through the side panel of the power supply.

The computer system also includes at least one cable. The cable has a plurality of electrical conductors extending from a first connector to a second connector. The first connector has such a complementary configuration relative to the motherboard's power connector that the first connector and the motherboard's power connector are matingly engageable with each other. Also, the second connector has such a complementary configuration to one or more of the plurality of DC output connectors of the power supply that the second connector is matingly engageable with one or more of the plurality of DC output connectors.

In some embodiments, the cable is a first cable, and the plurality of conductors is a first plurality of conductors. The power connector of the motherboard can be a first motherboard power connector, and the motherboard can have a second motherboard power connector configured to provide power to the processing unit. In such embodiments, computer system can also include a second cable having a second plurality of conductors extending from a connector configured to matingly engage with a corresponding one of the power supply's DC output connectors to a connector configured to matingly engage with the second power connector of the motherboard.

The power supply can also include a fan configured to draw air from inside the enclosure, to direct the air past the printed circuit board assembly, and to exhaust the air through the rear panel of the chassis.

Some embodiments of the computer system also include a graphics card comprising a power connector and being operably couplable with the motherboard. The computer system can include a further cable having a corresponding plurality of conductors extending from a connector configured to matingly engage with a corresponding one of the power supply's DC output connectors to a connector configured to matingly engage with the power connector of the graphics card.

In some computer system embodiments, the one or more voltage-regulated, DC outputs comprises one or more of a +3.3V DC output, a +5V DC output and a +12V DC output. The one or more of the +3.3V DC output, the +5V DC output and the +12V DC output can include at least one +3.3V DC output, at least one +5V DC output and at least one +12V DC output. Also, at least one of the one or more output connectors can include a plurality of electrical conductors, with at least one of the plurality of electrical conductors corresponding to the +3.3V DC output, at least one of the plurality of electrical conductors corresponding to the +5V DC output and at least one of the plurality of electrical conductors corresponding to the +12V DC output.

In some embodiments, the power connector of the motherboard is an ATX-compatible, 24-pin motherboard connector.

In some computer system embodiments, the printed circuit board assembly of the power supply can define a pair of opposed sides positioned between the front panel of the power supply and the rear panel of the power supply. The printed circuit board assembly can also include a back plate supporting the one or more output connectors, where the back plate is positioned adjacent one of the pair of opposed sides of the printed circuit board assembly and the side panel through which the plurality of DC output connectors extend.

The printed circuit board assembly can also include a diode bridge for converting the mains electricity input from an alternating current (AC) to a direct current (DC). The diode bridge can be positioned adjacent the other of the pair of sides of the printed circuit board assembly, opposite the back plate.

The printed circuit board assembly of the power supply can also include a power-factor correction coil positioned between the diode bridge and the back plate.

The printed circuit board assembly of the power supply can define a pair of opposed sides positioned between the front panel of the power supply and the rear panel of the power supply. The printed circuit board assembly of the power supply further can include a plurality of bulk capacitors and a main transformer positioned adjacent to each other, each of the main transformer and the plurality of bulk capacitors being positioned laterally inboard of the opposed sides of the printed circuit board assembly.

The foregoing and other features and advantages will become more apparent from the following detailed description, which proceeds with reference to the accompanying drawings.

BRIEF DESCRIPTION OF THE DRAWINGS

Referring to the drawings, wherein like numerals refer to like parts throughout the several views and this specification, aspects of presently disclosed principles are illustrated by way of example, and not by way of limitation.

DETAILED DESCRIPTION

The following describes various principles related to ergonomic and high-efficiency power supplies for computer systems. For example, certain aspects of disclosed principles pertain to convenient, modular connections for DC outputs from an ATX-compatible power supply. That said, descriptions herein of specific apparatus configurations and combinations of method acts are but particular examples of contemplated embodiments chosen as being convenient illustrative examples of disclosed principles. One or more of the disclosed principles can be incorporated in various other embodiments to achieve any of a variety of corresponding system characteristics.

Thus, embodiments having attributes that are different from those specific examples discussed herein can embody one or more presently disclosed principles and can be used in applications not described herein in detail. Accordingly, such alternative embodiments also fall within the scope of this disclosure.

I. Overview

Conventional, ATX-compatible power supplies receive mains electricity through their rear panel and provide DC outputs through their front panel, i.e., opposite the rear panel, which is positioned deep inside the computer's enclosure. Although the conventional ATX power supply layout with front-panel DC outputs remains effective and widely available, it also presents certain longstanding and heretofore unsolved problems. For example, the location of DC connectors on the front panel can lead to difficulty accessing the DC connectors deep inside the computer enclosure, as well as difficulty routing cables to the various sub-systems without impeding airflow and reducing overall system cooling. Additionally, this conventional arrangement may be less than optimal for computer systems with unique form factors or configurations.

Figures 1, 2:
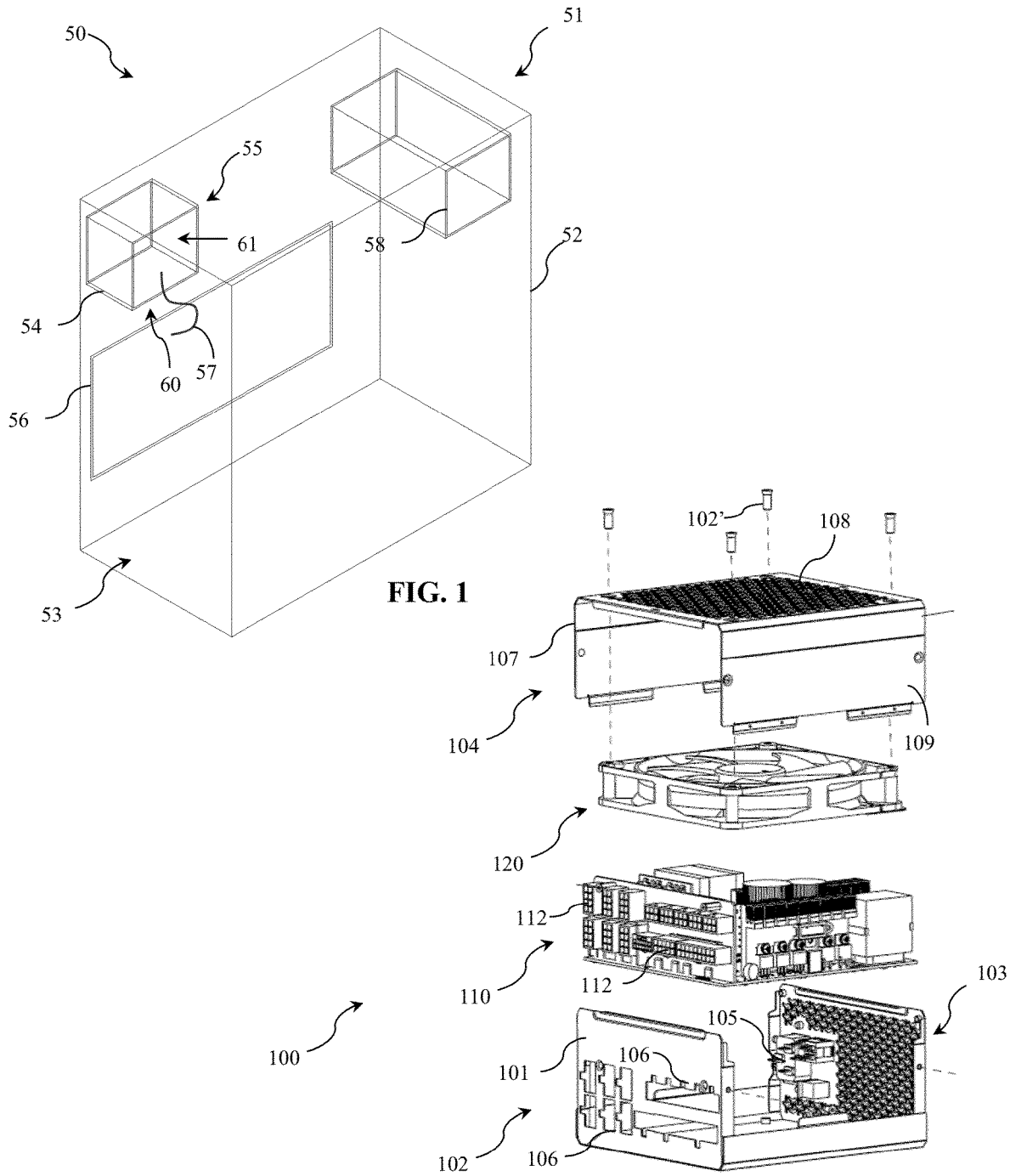
FIG. 1 schematically illustrates an isometric view of a desktop computer chassis having mounted therein a power supply, a drive bay and a motherboard.
FIG. 2 shows an exploded view of a prior-art power supply where the mains electricity enters through a rear panel and a plurality of DC power outputs exit through a front panel positioned opposite the rear panel.

FIG. 1 schematically illustrates a representative desktop computer system 50. The computer system 50 includes an enclosure having a chassis 52 and body panels (not shown). Body panels can provide an opportunity for system designers to provide external customization or other aesthetic qualities (e.g., branding). The chassis 52 defines a front panel 51 and a rear panel 53 and provides a framework for supporting sub-system components, such as, for example, a power supply 54 near the rear panel, a motherboard 56 near a side panel, a drive bay 58 near the front panel 51, and expansion cards (not shown) coupled with the motherboard, etc. In FIG. 1, a cable 57 is shown exiting from a side panel 60 of the power supply 55 and being connected with the motherboard 56 to power motherboard components. The arrangement (e.g., the location and orientation) of the various sub-system components corresponds generally to the ATX 3.0 standard. Of course, other sub-system arrangements are possible without departing from principles disclosed herein. By contrast to the embodiment shown, if the power supply 54 were embodied in a conventional manner, cables for powering the various sub-system components (including the motherboard) would exit from the front panel 55 of the power supply 54 rather than the side panel 60 as shown.

II. Representative Loads

Typical computer systems have several loads that need to be powered by a power supply. For example, a motherboard and its components typically receive power, in context of the ATX specification, through an ATX-compatible 24-pin connector. This connector is the primary power connector for the motherboard and includes several voltage rails, including +3.3V, +5V, +12V, −12V, and +5V standby. Some motherboards include one or more supplemental power connectors for powering certain sub-systems, e.g., processing units. In some embodiments, a motherboard includes a 4- or 8-pin connector for providing a dedicated source of power to a processing unit, e.g., a central processing unit (CPU). Some disclosed power supplies include one or more DC output connections suitable for powering such ATX-compatible 24-pin motherboard connectors and 4- and 8-pin connectors.

Some computer systems also include expansion cards for providing specific functions, e.g., enhanced graphics processing, input and output communication and power connections for control systems, etc. Such expansion cards can include a dedicated power connector, e.g., a PCIe connector. Some disclosed power supplies include one or more DC output connections suitable for powering one or more PCIe connectors. As well, some computer systems include storage devices, e.g., solid-state drives, that require power separate from the motherboard and expansion cards. Such storage devices often include a so-called SATA connector for receiving power. Some disclosed power supplies include one or more DC output connections suitable for powering one or more SATA connectors. Still further, some computer systems include legacy peripherals and cooling systems, each requiring a separate power connection. Often, so-called Molex connectors are used to power legacy peripherals and cooling systems and some disclosed power supplies include one or more DC output connections suitable for powering one or more Molex connectors.

The conventional placement of DC connections on the front panel facilitates easy access and cable management, as it allows users to route cables to the appropriate components within the computer case easily and efficiently. It also provides a standardized approach, ensuring compatibility with most computer cases designed to accommodate ATX power supplies. The approach has worked for decades.

III. Power Supply Design Considerations and Conventional Layouts

Designing a typical ATX power supply for desktop computers involves careful consideration of the location and orientation of externally accessible DC connections, as well as location and orientation of the various components on the power supply's printed circuit board assembly, while adhering to the ATX specified form, fit, and function. An ATX-compatible power supply fits within standardized dimensions, ensuring it fits properly in standard ATX-compliant computer chassis. Typical dimensions for an ATX-compatible power supply's enclosure range from about 150 mm to about 200 mm in length (from the front panel to the rear panel), about 150 mm in width (e.g., between side panels between the front and rear panels), and about 85 mm in height (e.g., between top and bottom panels between the front and rear panels). The ATX specification also identifies specific locations and sizes for mounting holes to accommodate standardized screws for assembling the power supply within a compatible computer chassis.

A suitable layout of the power supply's printed circuit board assembly should ensure clear separation and isolation between high-voltage components, e.g., AC input, rectification, and filtering, and low-voltage components, e.g., DC-DC converters and output connectors. For example, high-voltage components should be placed away from the low-voltage sections to prevent electrical hazards. Further, the AC input connector, e.g., IEC C14, is typically located on the rear panel of the power supply, facing outward, for easy access and connection to the mains power source. To facilitate these well-known design considerations, conventional power supplies have routed the AC input through the rear panel of the power supply and the DC outputs through the front panel of the power supply, with the various power-supply components (e.g., rectifiers, transformers, and filters) being substantially linearly routed therebetween.

Figure 3:
FIG. 3 schematically illustrates a layout of the printed circuit board assembly of the prior-art power supply shown in FIG. 2.

Referring now to FIGS. 2 and 3, a conventional power supply layout accounting for these design considerations in a conventional manner will be briefly described. In FIG. 2, the power supply 100 has a two-piece enclosure having a tray 102 and a cover 104 secured together with fasteners 102'. The power supply also includes a printed circuit board assembly 110 and a cooling fan 120. The tray 102 has a front panel 101 and a rear panel 103. The front panel defines several apertures 106 for accommodating DC output connectors 112 from the printed circuit board assembly, which nests within the tray 102. The rear panel 103 of the power supply 100 has an AC input connector 105 for connecting the power supply to mains power. The cooling fan 120 is positioned over top the printed circuit board assembly 110 to direct the fan's exhaust over the various components of the printed circuit board assembly. The rear panel 103 defines a vent sufficiently open to permit airflow from the fan to escape while still shielding against EMI radiation. The cover 104 includes a vented top side 108 and downwardly extending side walls 107, 109. The sidewalls 107 and 109 are solid panels, in part to confine airflow through, and EMI radiation within, the power supply.

Turning now to FIG. 3, a conventional layout of the printed circuit board assembly 110 is described. In FIG. 3, the mains input 105 and rear panel 103 are shown on the left side of the drawing and the front panel 101 and the DC output connectors 112 are shown on the right side of the drawing. Relative physical locations of the various power supply stages in the printed circuit board assembly 110 are shown using numbered blocks, as follows:

| Stage | Name | Description |
| --- | --- | --- |
| 1 | EMI | EMC/EMI filter to ensure radiation and conducted emissions are contained |
| 2 | AC/DC | Diode bridge for AC/DC rectification of the incoming AC mains power |
| 3 | PFC MOS | Power factor correction (PFC) MOSFETs and diodes |
| 4 | PFC Coil | PFC (interleave topology) |
| 5 | Relay | Relay to reduce inrush current |
| 6 | Capacitors | Bulk capacitors |
| 7 | Transformer | Main transformer |
| 8 | +5 V SB Card | Standby circuit |
| 9 | PFC Card | PFC for control unit |
| 10 | LLC Card | LLC for control unit |
| 11 | LLC Coil | Inductor part of LLC resonant circuit |
| 12 | LLC MOS | Half-bridge MOSFETs array of LLC stage for resonant circuit |
| 13 | LLC CAP | Capacitor part of LLC for resonant circuit |
| 14 | Isolation transformer | for signal sampling |
| 15 | SR | LLC stages secondary Synchronous Rectifier (SR) boards |
| 16 | DC/DC | Daughter board for transformation to 3.3 VDC and 5 VDC from 12 V DC |
| 17 | 12 V | Filtering for 12 V |
| 18 | CM Card | Back plate for DC output connectors |

As FIG. 3 indicates, the various functional stages in a conventional power supply 100 are arranged linearly from the AC input at the rear panel 103 to the DC outputs at the front panel 101.

IV. Ergonomic Power Supply Layouts

Disclosed power supplies can have similar or even identical power supply stages as described above in connection with conventional power supplies, but disclosed power supplies have different layouts to facilitate a side-panel exit for the DC connections. Further, disclosed power supplies can have similarly dimensioned enclosures as conventional power supplies, yet the enclosure arrangements and features can be substantially different.

For example, by contrast to conventional power supplies as in FIGS. 2 and 3, disclosed ergonomic power supplies retain the efficiency and high-performance of conventional power supplies while offering more convenient access to the DC outputs through innovative layouts of the printed circuit board assembly. Disclosed power supplies can have commonly required DC outputs positioned on a side panel of the power supply, which is much more easily accessed than the rear panel deep inside the computer's enclosure. For example, referring to FIG. 1 again, the DC outputs from a disclosed power supply can exit from side panel 60 or side panel 61, in contrast to the front panel 55 as with a conventional power supply. This new arrangement offers improved cable management, e.g., more convenient cable routing, cooling efficiency, and compatibility with diverse computer case form factors compared to conventional power-supply arrangements. By providing tidier cable routing, overall system aesthetics also are improved over conventional power supplies. Moreover, disclosed power supplies offer a degree of modularity by providing matingly engageable and dis-engageable electrical connectors for a variety of DC output voltages commonly used in computer systems, allowing users to include only those cables necessary for the loads that are in the users' systems and eliminating excess, unused cabling that can disrupt aesthetics and interfere with cooling and other systems.

Figure 4:
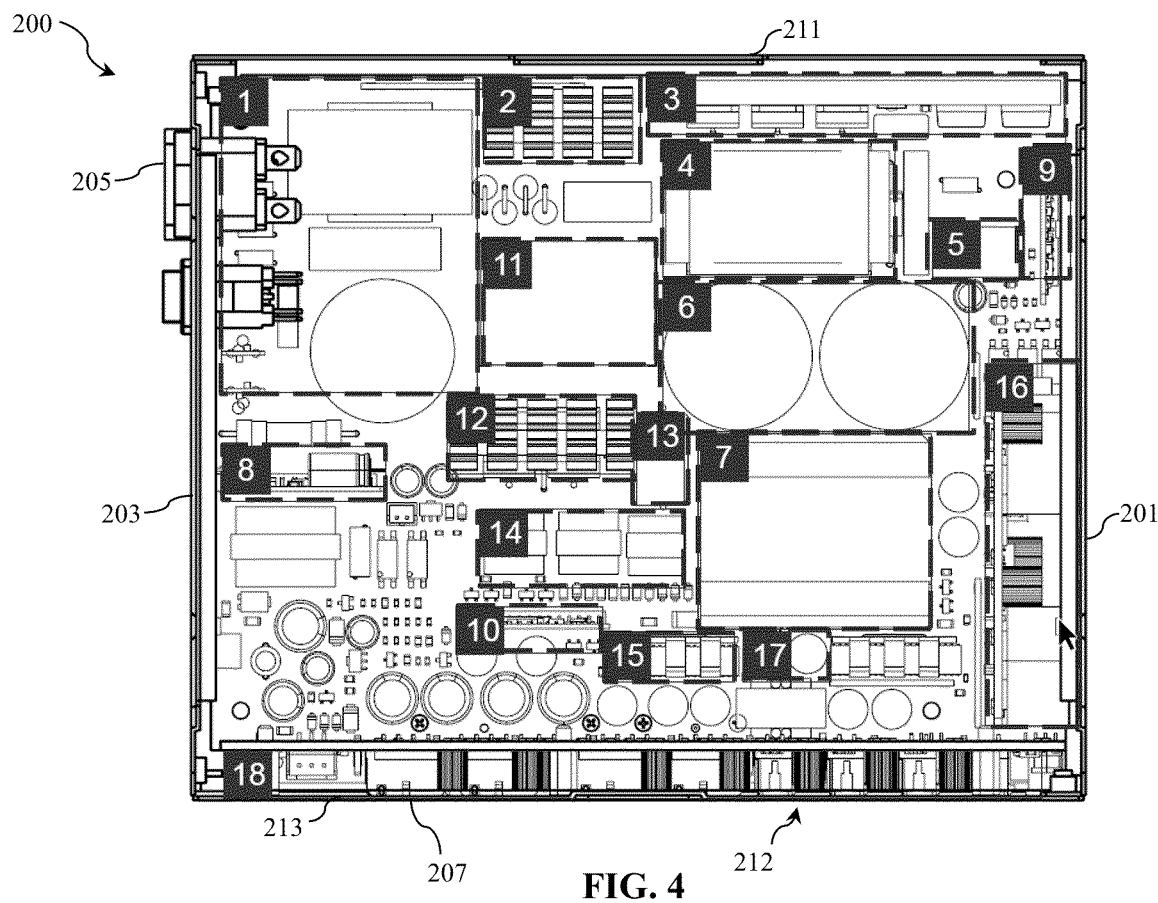
FIG. 4 schematically illustrates a printed circuit board layout for an ergonomic power supply as shown in FIG. 5.
Figure 5:
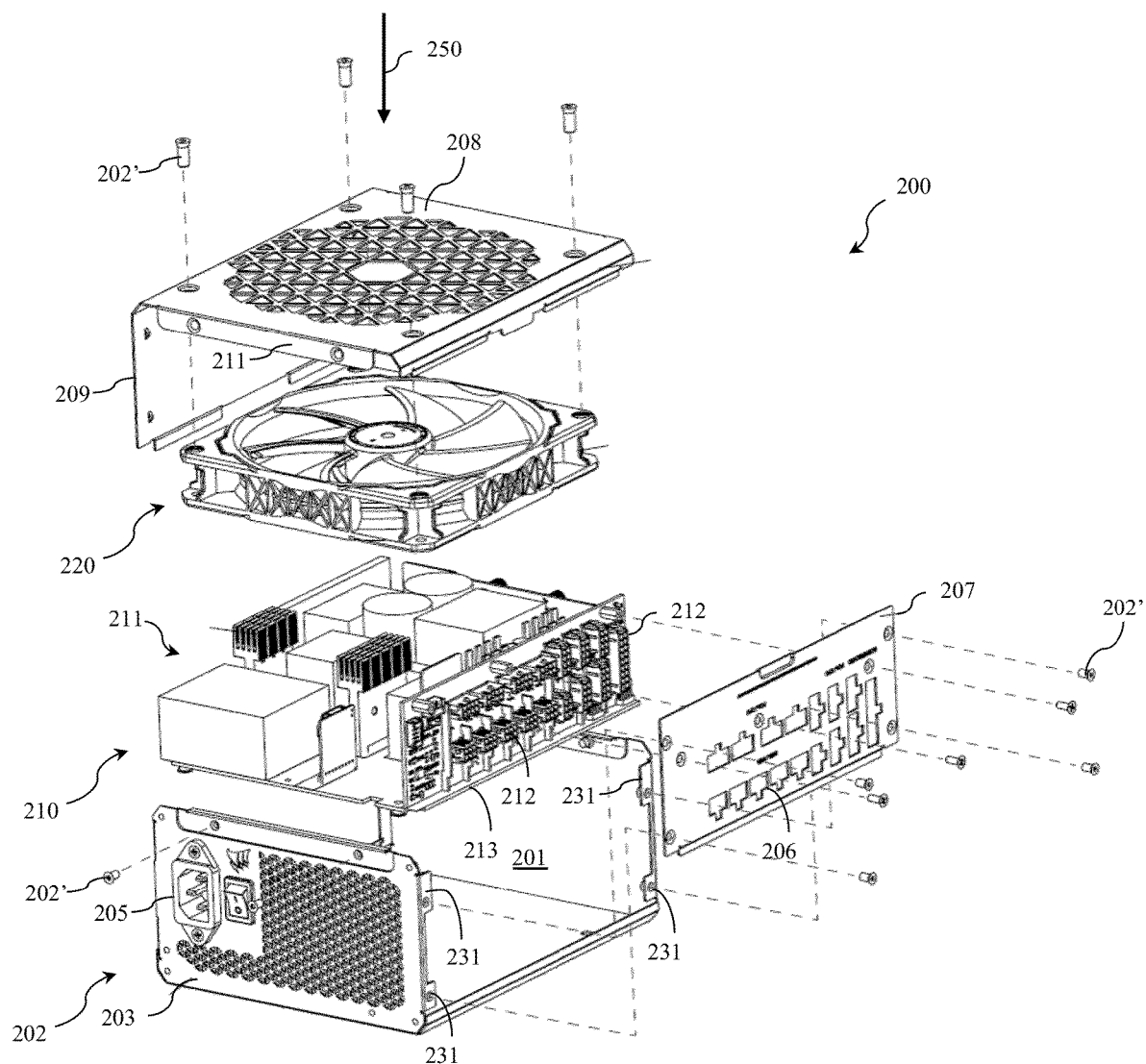
FIG. 5 shows an exploded view of an ergonomic power supply where the mains electricity enters through a rear panel and a plurality of DC power outputs exit through a side panel positioned adjacent the rear panel.

Referring now to FIGS. 4 and 5, the power supply 200 includes a printed circuit board assembly 210 configured to convert a mains electricity input (e.g., 120 VAC or 240 VAC) to one or more voltage-regulated, direct-current (DC) outputs. The printed circuit board assembly 210 defines a mains input and comprises one or more output connectors 212. Each of the one or more output connectors 212 corresponds to a selection of the one or more voltage-regulated, DC outputs. The power supply 200 also includes a mains connector 205 for receiving the mains electricity input. A fan 220 (FIG. 5) is arranged to urge a flow of air past the printed circuit board assembly 210. Further, the power supply 200 has an enclosure housing the fan 220 and the printed circuit board assembly 210. As shown in FIG. 5, the enclosure has a rear panel 203, a front panel 201 positioned opposite the rear panel, and a side panel 207, 209 positioned between the front panel and the rear panel. The rear panel 203 of the enclosure defines an aperture and the mains connector 205 extends through the aperture defined by the rear panel of the enclosure. The side panel 207 defines at least one aperture 206 corresponding to at least one of the one or more output connectors 212. In some embodiments, the mains input defined by the printed circuit board assembly can include the mains connector 205.

The enclosure of the illustrated power supply 200 includes a tray 202, a modular side panel 207 and a modular cover having a top side 208 and a side panel 209. When the tray 202, modular side panel 207 and modular cover are assembled, the flange 211 of the modular cover can fit within a corresponding and complementarily shaped recess defined by the rear panel 203. A fastener 202' can extend through a hole in the rear panel 203 and a hole in the flange 211, securing the flange 211 with the rear panel 203. Similarly, the modular side panel 207 can rest against one or more (e.g., a plurality of) flanges 231 defined by the tray 202 and fasteners 202' can secure the modular side panel 207 with the tray 202. The top panel 208 can also define a flange or a tab 208 that fits within a corresponding u-shaped channel 207' defined by the modular side panel 207, securing the seam between the top side 208 and the modular side panel 207 longitudinally from the front panel 201 to the rear panel 203. The modular side panel 207 can define a plurality of apertures 206, each corresponding to one or more DC output connectors 212 of the printed circuit board assembly.

The one or more voltage-regulated, DC outputs 212 can include one or more of a +3.3V DC output, a +5V DC output and a +12V DC output. In some embodiments, the DC outputs include at least one +3.3V DC output, at least one +5V DC output and at least one +12V DC output. Generally speaking, embodiments of disclosed ergonomic power supplies include a plurality of output connectors, each having a pinout suitable for delivering sufficient power to conventional power connectors in desktop computer systems, such as, for example, motherboard power connectors, CPU power connectors, power connectors for graphics and other expansion cards, power connectors for storage drives, e.g., solid state storage drives, legacy peripherals and fans, as well as other peripherals, such as, for example, LED lighting and other peripherals desired by end users.

In some embodiments, an output connector includes a plurality of electrical conductors. At least one of the plurality of electrical conductors can correspond to the +3.3V DC output, at least one of the plurality of electrical conductors can correspond to the +5V DC output and at least one of the plurality of electrical conductors can correspond to the +12V DC output.

The one or more output connectors can be configured to supply sufficient power across the +3.3V DC output, the +5V DC output and the +12V DC output to supply power to an ATX-compatible, 24-pin motherboard connector.

Referring still to FIGS. 4 and 5, the printed circuit board assembly 210 can define a pair of opposed sides 211, 213 positioned between the front panel 201 of the enclosure and the rear panel 203 of the enclosure and corresponding to the side panels 209 and 207, respectively. For purposes of clarification, the plan view shown of the printed circuit board assembly 210 shown in FIG. 4 is generally viewed from a position along the arrow 250 shown in FIG. 5. The printed circuit board assembly 210 can include a back plate 18 supporting the one or more output connectors 212 and a diode bridge 2 for converting the mains electricity input from an alternating current (AC) to a direct current (DC). The back plate 18 can be positioned adjacent the side 213 of the printed circuit board assembly 210 and the side panel 207 defining the aperture 206 through which the output connectors 212 extend. In the illustrated embodiment, the diode bridge 2 is positioned adjacent the other side 211 of the printed circuit board assembly, opposite the back plate 18 and side 213.

In some embodiments, as shown in FIGS. 4 and 5, the printed circuit board assembly 210 further comprises a power-factor correction coil 4 positioned between the diode bridge 2 and the back plate 18.

As shown in FIGS. 4 and 5, a disclosed printed circuit board assembly 210 can also include a plurality of bulk capacitors 6 and a main transformer 7 positioned adjacent to each other. One or both of the main transformer 7 and the plurality of bulk capacitors 6 can be positioned laterally inboard of the opposed sides 211, 213 of the printed circuit board assembly 210, as shown in FIG. 4. In FIG. 4, the main transformer 7 and the plurality of bulk capacitors 6 are positioned between the diode bridge 2 and the back plate. More particularly, the main transformer 7 and the plurality of bulk capacitors 6 are positioned between the power-factor correction coil 4 and the back plate 18. The printed circuit board assembly 210 can also include an LLC-resonant circuit having an inductor 11 and an array of half-bridge MOSFETs 12. In some embodiments, including the embodiment shown in FIGS. 4 and 5, neither the inductor 11 nor the array of half-bridge MOSFETs 12 is positioned between the main transformer 7 and the plurality of bulk capacitors 6. Rather, the inductor 11 and half-bridge MOSFETs 12 are positioned adjacent the main transformer 7 and the bulk capacitors 6. More particularly, in the embodiment shown in FIG. 4, the inductor 11 and half-bridge MOSFETs 12 are positioned between the back panel 203 and one or both of the main transformer 7 and the bulk capacitors 6. Further, the DC-to-DC daughter board 16 for transforming 12V DC to 3.3V DC and 5V DC, in the embodiment shown in FIG. 4, is positioned adjacent the front panel 201 and oriented transversely relative to the back plate 18. For example, the daughter board 16 shown in FIG. 4 defines an elongate major axis oriented parallel to the front panel 201 of the enclosure and transverse to a similar elongate longitudinal axis defined by the back plate 18, which is parallel to the side panel 213.

With such an unconventional layout, the inventors discovered how to provide DC output connectors 212 that exit through a side panel 207, while still providing ATX-compliant rectification of mains electricity to stable DC output voltages, e.g., to 12V DC, 5V DC and 3.3V DC. Layouts as generally shown in FIGS. 4 and 5 and described herein can provide ergonomic power supplies that retain the efficiency and high-performance of conventional power supplies while offering more convenient access to the DC outputs 212. Such power supplies substantially improve user convenience and provide other benefits described herein compared to conventional ATX-compliant power supplies that provided DC outputs only through a front panel.

VI. Computing Environments

Figure 6:
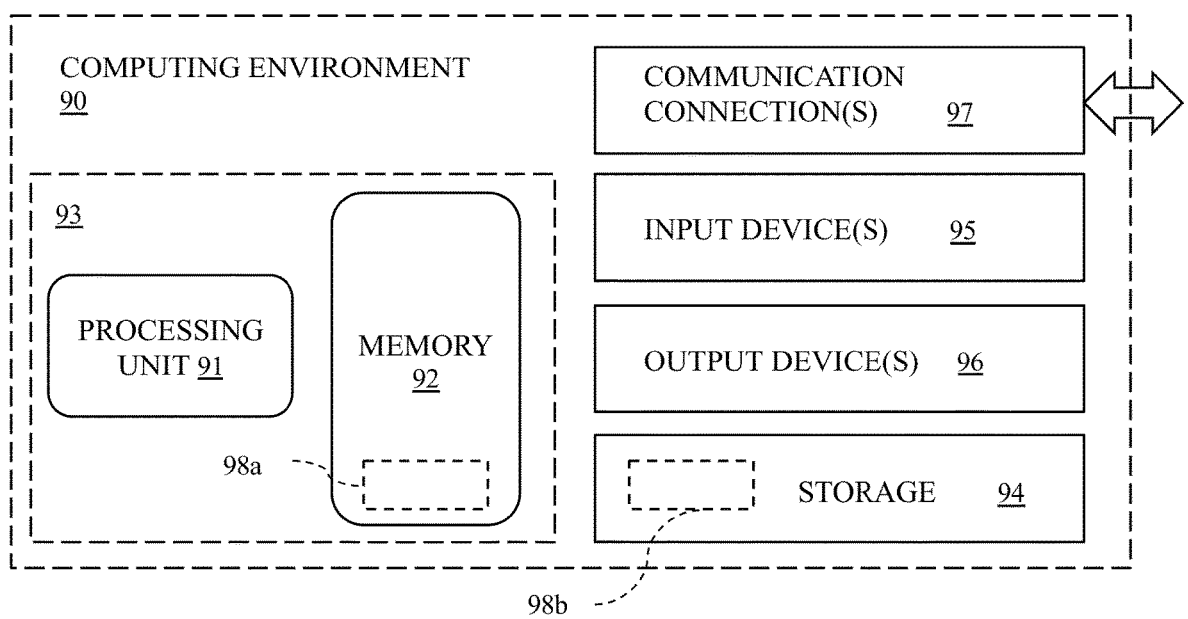
FIG. 6 shows a block diagram of a computing environment that can be powered by an ergonomic power supply disclosed herein.

FIG. 6 illustrates a generalized example of a computing environment 90 (e.g., a computer system) that can incorporate and benefit from disclosed ergonomic power supplies. The computing environment 90 is not intended to suggest any limitation as to scope of use or functionality of the technologies disclosed herein, as each technology may be implemented in diverse general-purpose or special-purpose embodiments. For example, each disclosed technology may be implemented with other computer system configurations, including multiprocessor systems, microprocessor-based or programmable consumer electronics, embedded platforms, network computers, minicomputers, mainframe computers, data centers, audio appliances, and the like.

The computing environment 90 includes at least one central processing unit 91 and a memory 92. In FIG. 6, this most basic configuration 93 is included within a dashed line. The central processing unit 91 executes computer-executable instructions and may be a real or a virtual processor. In a multi-processing system, or in a multi-core central processing unit, multiple processing units execute computer-executable instructions (e.g., threads) to increase processing speed and as such, multiple processors can run simultaneously, despite the processing unit 91 being represented by a single functional block. A processing unit can include an application specific integrated circuit (ASIC), a general-purpose microprocessor, a field-programmable gate array (FPGA), a digital signal controller, or a set of hardware logic structures arranged to process instructions. The processing unit 91 can be powered from a general-purpose motherboard connector or from a dedicated power connector.

The memory 92 may be volatile memory (e.g., registers, cache, RAM), non-volatile memory (e.g., ROM, EEPROM, flash memory, etc.), or some combination of the two. The memory 92 stores software 98a that can, for example, implement one or more of the technologies described herein, when executed by a processor, e.g., the processing unit 91.

A computing environment may have additional features. For example, the computing environment 90 includes storage 94, one or more input devices 95, one or more output devices 6, and one or more communication connections 97. An interconnection mechanism (not shown) such as a bus, a controller, or a network, interconnects the components of the computing environment 90. Typically, operating system software (not shown) provides an operating environment for other software executing in the computing environment 90, and coordinates activities of the components of the computing environment 90. Such additional features can draw power directly from disclosed ergonomic power supplies or indirectly from an intermediate component, such as, for example, a motherboard.

The store 94 may be removable or non-removable and can include selected forms of machine-readable media. In general, machine-readable media includes magnetic disks, magnetic tapes or cassettes, non-volatile solid-state memory, CD-ROMs, CD-RWs, DVDs, magnetic tape, optical data storage devices, and carrier waves, or any other machine-readable medium which can be used to store information, and which can be accessed within the computing environment 90. The storage 94 can store instructions for the software 98b, which can implement technologies described herein.

The store 94 can also be distributed over a network so that software instructions are stored and executed in a distributed fashion. In other embodiments, some of these operations might be performed by specific hardware components that contain hardwired logic. Those operations might alternatively be performed by any combination of programmed data processing components and fixed hardwired circuit components. The store 94 can draw power directly from disclosed ergonomic power supplies or indirectly from an intermediate component, such as, for example, a motherboard.

The input device(s) 95 may be any one or more of the following: a touch input device, such as a keyboard, keypad, mouse, pen, touchscreen, touch pad, or trackball; a voice input device, such as a microphone transducer, speech-recognition software and processors; a scanning device; or another device, that provides input to the computing environment 90. For audio, the input device(s) 95 may include a microphone or other transducer (e.g., a sound card or similar device that accepts audio input in analog or digital form), or a computer-readable media reader that provides audio samples to the computing environment 90. Such input devices can draw power directly from disclosed ergonomic power supplies or indirectly from an intermediate component, such as, for example, a motherboard.

The output device(s) 96 may be any one or more of a display, printer, loudspeaker transducer, DVD-writer, or another device that provides output from the computing environment 90. Such output devices can draw power directly from disclosed ergonomic power supplies or indirectly from an intermediate component, such as, for example, a motherboard.

The communication connection(s) 97 enable communication over or through a communication medium (e.g., a connecting network) to another computing entity. A communication connection can include a transmitter and a receiver suitable for communicating over a local area network (LAN), a wide area network (WAN) connection, or both. LAN and WAN connections can be facilitated by a wired connection or a wireless connection. If a LAN or a WAN connection is wireless, the communication connection can include one or more antennas or antenna arrays. The communication medium conveys information such as computer-executable instructions, compressed graphics information, processed signal information (including processed audio signals), or other data in a modulated data signal. Examples of communication media for so-called wired connections include fiber-optic cables and copper wires. Communication media for wireless communications can include electromagnetic radiation within one or more selected frequency bands. Such communication connections can draw power directly from disclosed ergonomic power supplies or indirectly from an intermediate component, such as, for example, a motherboard.

VII. Other Embodiments

The embodiments described above generally concern ergonomic power supplies for supplying power to computer systems. Nonetheless, the previous description is provided to enable a person skilled in the art to make or use the disclosed principles. Embodiments other than those described above in detail are contemplated based on the principles disclosed herein, together with any attendant changes in configurations of the respective apparatus or changes in order of method acts described herein, without departing from the spirit or scope of this disclosure. Various modifications to the examples described herein will be readily apparent to those skilled in the art.

Directions and other relative references (e.g., up, down, top, bottom, left, right, rearward, forward, etc.) may be used to facilitate discussion of the drawings and principles herein, but are not intended to be limiting. For example, certain terms may be used such as "up," "down,", "upper," "lower," "horizontal," "vertical," "left," "right," and the like. Such terms are used, where applicable, to provide some clarity of description when dealing with relative relationships, particularly with respect to the illustrated embodiments. Such terms are not, however, intended to imply absolute relationships, positions, and/or orientations. For example, with respect to an object, an "upper" surface can become a "lower" surface simply by turning the object over. Nevertheless, it is still the same surface, and the object remains the same. As used herein, "and/or" means "and" or "or", as well as "and" and "or." Moreover, all patent and non-patent literature cited herein is hereby incorporated by reference in its entirety for all purposes.

And, those of ordinary skill in the art will appreciate that the exemplary embodiments disclosed herein can be adapted to various configurations and/or uses without departing from the disclosed principles. Applying the principles disclosed herein, it is possible to provide a wide variety of ergonomic and high-efficiency power supplies for computer systems, and related methods and systems. For example, the principles described above in connection with any particular example can be combined with the principles described in connection with another example described herein. Thus, all structural and functional equivalents to the features and method acts of the various embodiments described throughout the disclosure that are known or later come to be known to those of ordinary skill in the art are intended to be encompassed by the principles described and the features and acts claimed herein. Accordingly, neither the claims nor this detailed description shall be construed in a limiting sense, and following a review of this disclosure, those of ordinary skill in the art will appreciate the wide variety embodiments that can be devised using the various concepts described herein.

Moreover, nothing disclosed herein is intended to be dedicated to the public regardless of whether such disclosure is explicitly recited in the claims. No claim feature is to be construed under the provisions of 35 USC 112(f), unless the feature is expressly recited using the phrase "means for" or "step for".

The appended claims are not intended to be limited to the embodiments shown herein but are to be accorded the full scope consistent with the language of the claims, wherein reference to a feature in the singular, such as by use of the article "a" or "an" is not intended to mean "one and only one" unless specifically so stated, but rather "one or more". Further, in view of the many possible embodiments to which the disclosed principles can be applied, we reserve the right to claim any and all combinations of features and technologies described herein as understood by a person of ordinary skill in the art, including the right to claim, for example, all that comes within the scope and spirit of the foregoing description, as well as the combinations recited, literally and equivalently, in any claims presented anytime throughout prosecution of this application or any application claiming benefit of or priority from this application, and more particularly but not exclusively in the claims appended hereto.

We currently claim:

1. A power supply for a computer system, the power supply comprising:
    an enclosure having a rear panel, a front panel positioned opposite the rear panel, and a pair of opposed side panels positioned between the front panel and the rear panel;
    a printed circuit board defining a rear edge, a front edge positioned opposite the rear edge, and a pair of opposed side edges, each side edge extending from the rear edge to the front edge, wherein the printed circuit board is so oriented within the enclosure that the rear edge, the front edge and each side edge correspond, respectively, to the rear panel, the front panel, and one of the opposed side panels;
    a mains electricity input to the printed circuit board positioned adjacent the rear panel of the enclosure;
    a diode bridge coupled with the printed circuit board and configured to convert the mains electricity input to the printed circuit board from an alternating current (AC) to a direct current (DC), wherein the diode bridge is positioned adjacent one of the side edges of the printed circuit board's pair of side edges;
    an electrical connector extending through the side panel of the enclosure opposite the side edge of the printed circuit board adjacent the diode bridge and being so coupled with the printed circuit board at a position opposite the diode bridge, relative to the printed circuit board, as to output a voltage-regulated form of the DC converted from the AC mains input; and
    a back plate supporting the electrical connector.

2. The power supply according to claim 1, further comprising a power-factor correction coil coupled with the printed circuit board between the diode bridge and the back plate.

3. The power supply according to claim 1, further comprising a DC-to-DC daughter board configured to transform 12V DC to one or both of 3.3V DC and 5V DC, wherein the daughter board defines an elongate longitudinal axis and wherein the back plate defines an elongate longitudinal axis, the elongate longitudinal axis of the DC-to-DC daughter board is oriented transverse relative to the elongate longitudinal axis of the back plate.

4. The power supply according to claim 1, further comprising a DC-to-DC daughter board configured to transform 12V DC to one or both of 3.3V DC and 5V DC, wherein the daughter board defines an elongate longitudinal axis oriented substantially parallel with the front edge of the printed circuit board.

5. The power supply according to claim 4, wherein the DC-to-DC daughter board is positioned adjacent the front edge of the printed circuit board.

6. The power supply according to claim 1, wherein the voltage-regulated form of the DC converted from the AC mains input comprises one or more of a +3.3V DC output, a +5V DC output and a +12V DC output.

7. The power supply according to claim 6, wherein the one or more of the +3.3V DC output, the +5V DC output and the +12V DC output comprises at least one +3.3V DC output, at least one +5V DC output and at least one +12V DC output.

8. The power supply according to claim 1, wherein the electrical connector is a first DC electrical connector and the voltage-regulated form of the DC is a first voltage-regulated form of the DC corresponding to the first DC electrical connector, the power supply comprising a second DC electrical connector so coupled with the printed circuit board at a position opposite the diode bridge, relative to the printed circuit board, as to output a second voltage-regulated form of the DC converted from the AC mains input.

9. The power supply according to claim 8, wherein each of the first voltage-regulated form and the second voltage-regulated form of the DC converted from the AC mains input comprises one or more of a +3.3V DC output, a +5V DC output and a +12V DC output.

10. The power supply according to claim 1, further comprising a plurality of bulk capacitors coupled with the printed circuit board adjacent each other and laterally inboard from the pair of opposed side edges.

11. The power supply according to claim 10, further comprising a main transformer coupled with the printed circuit board laterally inboard from the pair of opposed side edges and adjacent the plurality of bulk capacitors.

12. The power supply according to claim 11, wherein the main transformer and the plurality of bulk capacitors are positioned between the diode bridge and the back plate.

13. A power supply for a computer system, the power supply comprising:
    an enclosure having a rear panel, a front panel positioned opposite the rear panel, and a pair of opposed side panels positioned between the front panel and the rear panel;
    a printed circuit board defining a rear edge, a front edge positioned opposite the rear edge, and a pair of opposed side edges, each side edge extending from the rear edge to the front edge, wherein the printed circuit board is so oriented within the enclosure that the rear edge, the front edge and each side edge correspond, respectively, to the rear panel, the front panel, and one of the opposed side panels;
    a mains electricity input to the printed circuit board positioned adjacent the rear panel of the enclosure;
    a diode bridge coupled with the printed circuit board and configured to convert the mains electricity input to the printed circuit board from an alternating current (AC) to a direct current (DC), wherein the diode bridge is positioned adjacent one of the side edges of the printed circuit board's pair of side edges;

an electrical connector being so coupled with the printed circuit board at a position opposite the diode bridge, relative to the printed circuit board, as to output a voltage-regulated form of the DC converted from the AC mains input;

a plurality of bulk capacitors coupled with the printed circuit board adjacent each other and laterally inboard from the pair of opposed side edges;

a main transformer coupled with the printed circuit board laterally inboard from the pair of opposed side edges and adjacent the plurality of bulk capacitors; and an LLC-resonant circuit having an inductor and an array of half-bridge MOSFETs, wherein the inductor and the array of half-bridge MOSFETs are positioned adjacent to, but not between, the main transformer and the plurality of bulk capacitors.

14. The power supply according to claim 13, wherein the inductor and the array of half-bridge MOSFETs are positioned between the rear panel of the enclosure and one or both of the main transformer and the plurality of bulk capacitors.

15. A computer system comprising:

a motherboard having a power connector for receiving a direct current (DC) power input, the motherboard further having circuitry to convey the DC power input to a processing unit and a memory, the motherboard further having a signal bus interconnecting the processing unit and the memory;

an enclosure having a rear panel, a front panel positioned opposite the rear panel, and a pair of opposed side panels positioned between the front panel and the rear panel;

a printed circuit board assembly within the enclosure and configured to rectify an AC mains power input to one or more voltage-regulated DC outputs suitable for powering the processing unit and the memory, wherein the printed circuit board assembly has a mains input positioned adjacent the rear panel of the enclosure and a DC output connector positioned adjacent a selected one of the side panels in the pair of side panels, the printed circuit board assembly further having a diode bridge configured to convert the mains power input from an alternating current to a direct current, the diode bridge being positioned adjacent the other one of the side panels in the pair of side panels; and an electrical cable so electrically coupled with the DC output connector and the motherboard circuitry as to be configured to power the processing unit and the memory with the one or more voltage-regulated DC outputs;

an LLC-resonant circuit having an inductor and an array of half-bridge MOSFETs, wherein the inductor and the array of half-bridge MOSFETs are positioned adjacent to, but not between, the main transformer and the plurality of bulk capacitors;

a plurality of bulk capacitors coupled with the printed circuit board assembly adjacent each other; and a main transformer coupled with the printed circuit board assembly at a position adjacent the plurality of bulk capacitors.

16. The computer system according to claim 15, wherein the printed circuit board assembly further comprises a power-factor correction coil and a back plate supporting the DC output connector, the power-factor correction coil being coupled with the printed circuit board between the diode bridge and the back plate.

17. The computer system according to claim 15, wherein the main transformer and the plurality of bulk capacitors are positioned laterally inward of the diode bridge and the back plate relative to the opposed side panels of the enclosure.

18. The computer system according to claim 15, wherein the inductor and the array of half-bridge MOSFETs are positioned between the rear panel of the enclosure and one or both of the main transformer and the plurality of bulk capacitors.

* * * * *